United States Patent [19]
Lierle

[11] Patent Number: 5,602,605
[45] Date of Patent: Feb. 11, 1997

[54] FLASH ASSEMBLY

[76] Inventor: Kenneth N. Lierle, 2103 Flint Rd., Madison, Ind. 47250

[21] Appl. No.: 640,482

[22] Filed: May 1, 1996

[51] Int. Cl.⁶ .......................... G03B 15/03; G03B 15/02; G03B 11/00
[52] U.S. Cl. .............. 396/175; 362/18; 396/155
[58] Field of Search .................. 354/126, 295, 354/149.1

[56] References Cited

U.S. PATENT DOCUMENTS 3,798,668  3/1974  Hartmann .................. 354/149
4,462,666  7/1984  Orban .................. 354/126
4,615,599  10/1986  Kataoka et al. .................. 354/415
5,040,007  8/1991  Hagiuda .................. 354/145.1
5,065,177  11/1991  Yamamoto et al. .................. 354/403

Primary Examiner—Safet Metjahic
Assistant Examiner—Daniel Chapik

[57]  ABSTRACT

An attachment for a camera which produces a flash of increased intensity to enable the lighting of objects at great distances. The attachment includes a first housing with a flash lamp and a condensing lens, and a second housing with a diffusing lens.

4 Claims, 3 Drawing Sheets

FLASH ASSEMBLY

BACKGROUND OF THE INVENTION

1. Field of the Invention

The present invention relates to flash assembly and more particularly pertains to illuminating objects at great distances.

2. Description of the Prior Art

The use of flash devices is known in the prior art. More specifically, flash devices heretofore devised and utilized for the purpose of illuminating objects are known to consist basically of familiar, expected, and obvious structural configurations, notwithstanding the myriad of designs encompassed by the crowded prior art which has been developed for the fulfillment of countless objectives and requirements.

By way of example, U.S. Pat. Nos. 5,126,779 to Wheeler et al; 4,023,188 to Ueda et al; 5,019,845 to Asakura et al; 4,175,279 to Asaki; 5,200,792 to Tajima et al.; 3,488,486 to Bretthauer; and 4,941,070 to Ogawa et al. all relate to flash assemblies.

In this respect, the flash assembly according to the present invention substantially departs from the conventional concepts and designs of the prior art, and in doing so provides an apparatus primarily developed for the purpose of illuminating objects at great distances.

Therefore, it can be appreciated that there exists a continuing need for new and improved flash assembly which can be used for illuminating objects at great distances. In this regard, the present invention substantially fulfills this need.

SUMMARY OF THE INVENTION

In view of the foregoing disadvantages inherent in the known types of flash devices now present in the prior art, the present invention provides an improved flash assembly. As such, the general purpose of the present invention, which will be described subsequently in greater detail, is to provide a new and improved flash assembly and method which has all the advantages of the prior art and none of the disadvantages.

To attain this, the present invention essentially comprises a camera flash magnification assembly. This assembly includes a cylindrical minor housing assembly having a opened forward end, a closed rearward end, and a hollow interior. The hollow interior has a lower surface, a rearward portion, a forward portion and an intermediate extent therebetween. A first aperture is formed within the lower surface of the minor housing assembly at the rearward portion; a second aperture is formed within the lower surface of the minor housing assembly at the forward portion; and a third aperture formed within the closed rearward end. The flash assembly includes an apertured reflector positioned within the opened forward end of the minor housing; a flash lamp positioned within the aperture of the reflector; and a power supply & electronics positioned within the rearward portion of the minor housing. An electrical contact is positioned within the first aperture of the minor housing, and electrical wiring serves to interconnecting the electrical contact, the power supply and the flash lamp. An adjustment assembly is included which is positioned within the second aperture of the minor housing. This adjustment assembly includes a threaded bolt threadably secured within the second aperture, and an angle adjusting nut threadably positioned upon the threaded bolt. A condensing lens is positioned within the opened forward end of the minor housing, this condensing lens functions to condense light emitted by the flash lamp and directed by the reflector. A major housing assembly is included in the which has a apertured forward portion and an opened rearward portion, with the opened rearward portion of the major housing adapted to be secured over the forward end of the minor housing. A diffusion lens is positioned within the major housing intermediate the forward and rearward portions. This diffusion lens is adapted to scatter light emitted by the flash lamp, directed by the reflector and concentrated by the condensing lens. The third housing is a focusing lens housing which is defined by an opened forward portion and an opened rearward portion. The rearward portion of the lens housing is adapted to be inserted within the aperture of the forward portion of the major housing. A focusing lens is positioned within the opened forward portion of the lens housing.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved flash assembly which have all the advantages of the prior art flash devices and none of the disadvantages.

It is another object of the present invention to provide new and improved flash assembly which may be easily and efficiently manufactured and marketed.

It is further object of the present invention to provide new and improved flash assembly which are of durable and reliable constructions.

An even further object of the present invention is to provide new and improved flash assembly which are susceptible of a low cost of manufacture with regard to both materials and labor, and which accordingly are then susceptible of low prices of sale to the consuming public, thereby making such flash assembly economically available to the buying public.

Still yet another object of the present invention is to provide new and improved flash assembly which provide in the apparatuses and methods of the prior art some of the advantages thereof, while simultaneously overcoming some of the disadvantages normally associated therewith.

Even still another object of the present invention is to illuminating objects at great distances.

Lastly, it is an object of the present invention to provide new and improved flash assembly for a camera which produces a flash of increased intensity to enable the lighting of objects at great distances. In its broadest context the present invention includes a first housing with a flash lamp and a condensing lens, and a second housing with a diffusing lens. The various components of the present invention, and the manner in which they interrelate, will be described in great detail hereinafter.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
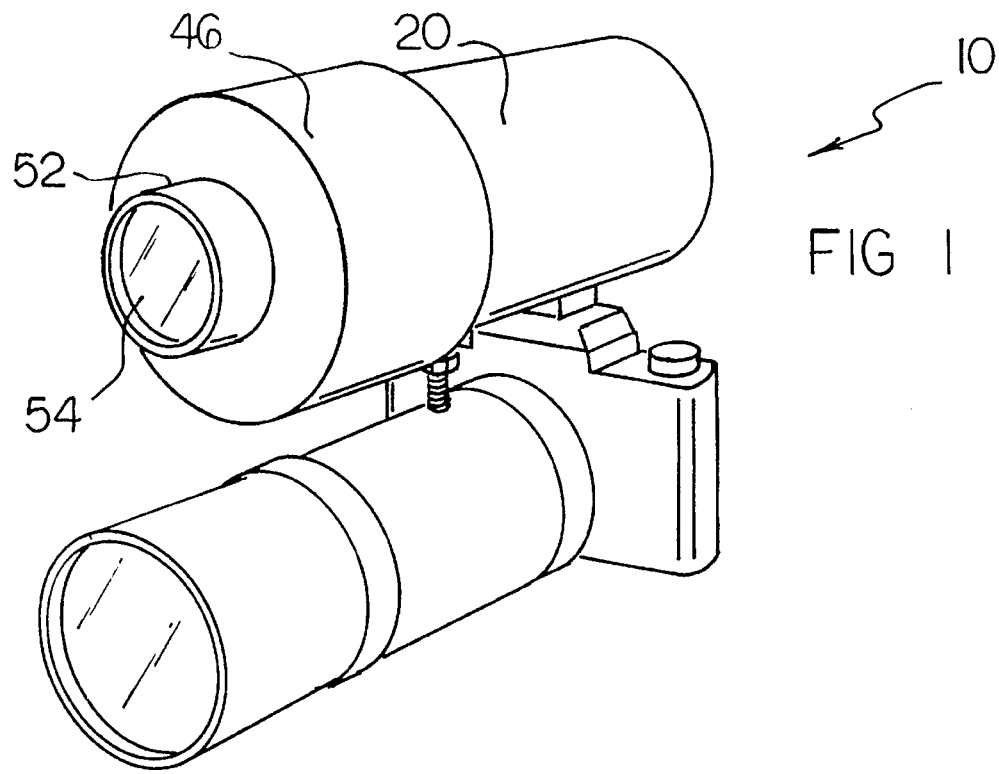
FIG. 1 is a perspective view of the preferred embodiment of the flash assembly constructed in accordance with the principles of the present invention.
Figure 2:
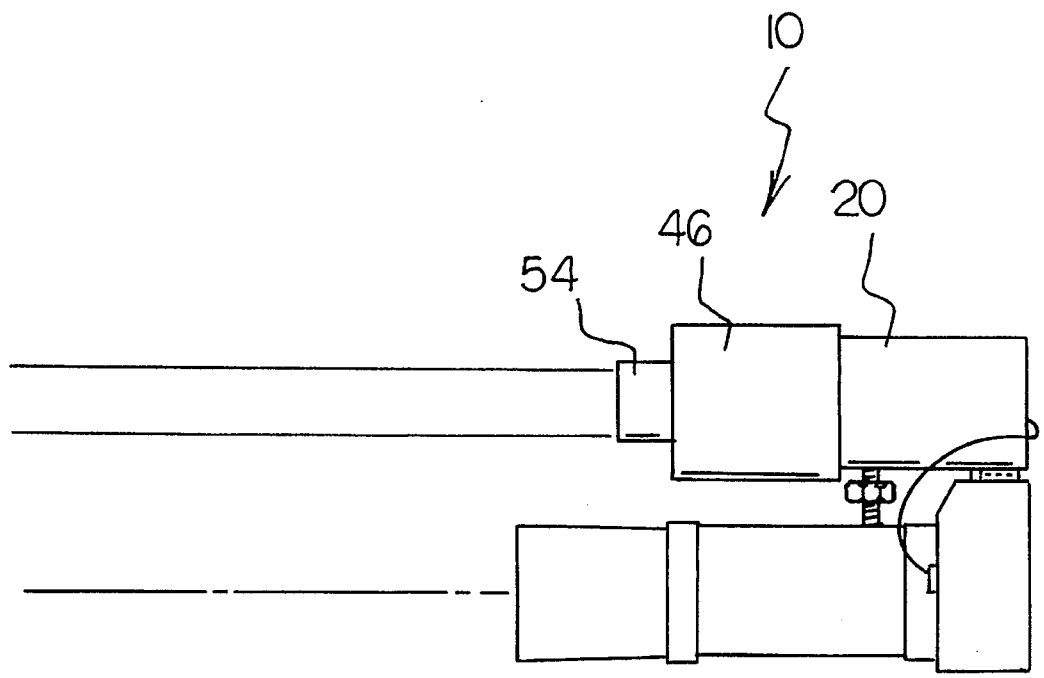
FIG. 2 is a side elevational view of the camera and associated flash assembly of the present invention.
Figure 3:
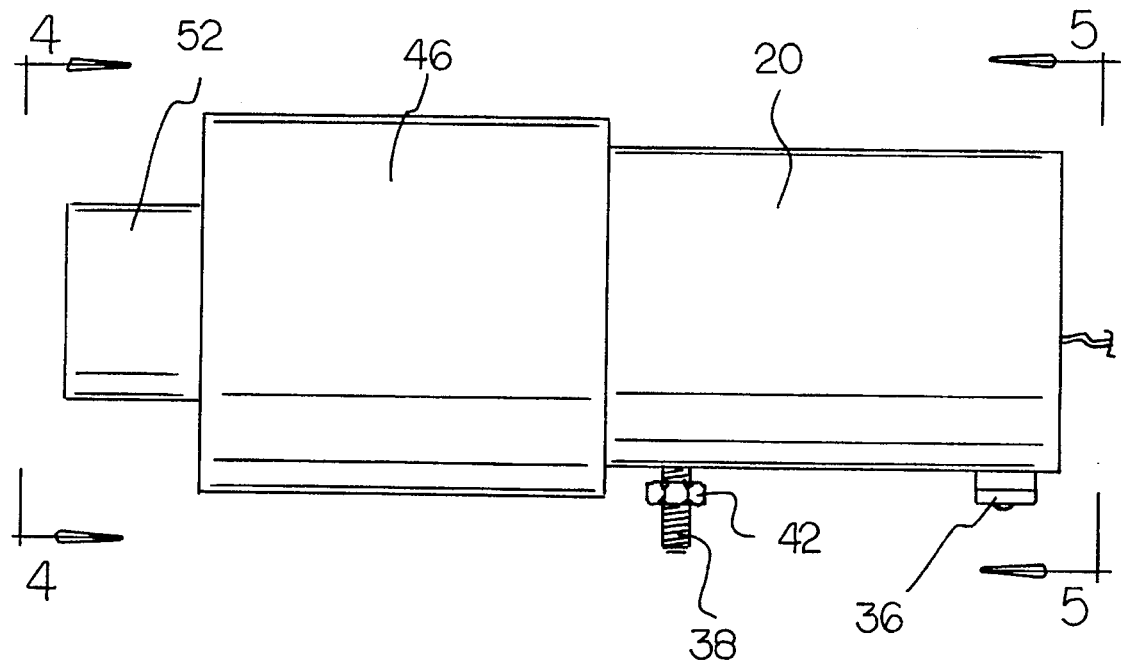
FIG. 3 is a view of the flash assembly of the present invention.
Figure 4:
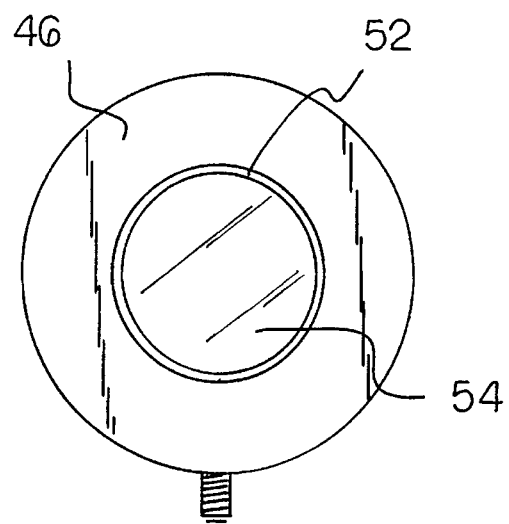
FIG. 4 is a view taken along line 4—4 of FIG. 3.
Figure 5:
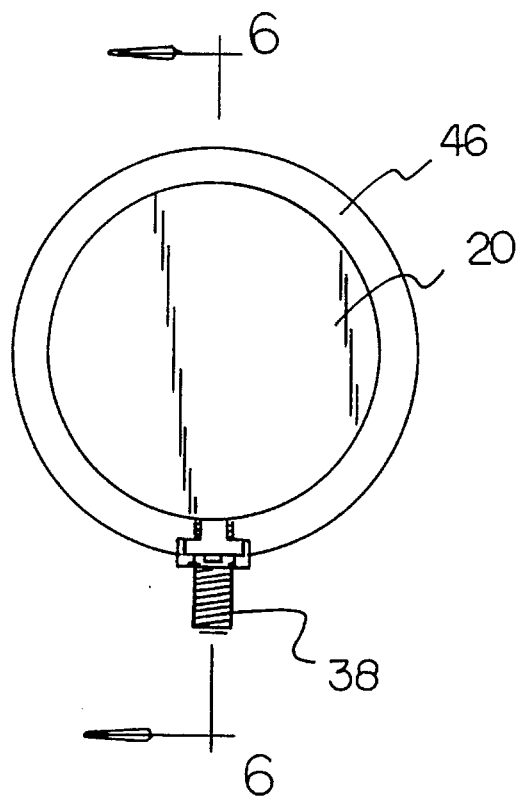
FIG. 5 is a view taken along line 5—5 of FIG. 3.

With reference now to the drawings, and in particular to FIG. 1 thereof, the preferred embodiment of the new and improved flash assembly embodying the principles and concepts of the present invention and generally designated by the reference numeral 10 will be described.

The present invention relates to a flash assembly for a camera which produces a flash of increased intensity to enable the lighting of objects at great distances. In its broadest context the present invention includes a first housing with a flash lamp and a condensing lens, and a second housing with a diffusing lens. These lenses serve to produce a magnified flash of light. The various components of the present invention, and the manner in which they interrelate, will be described in great detail hereinafter.

The first housing, or cylindrical minor housing 20 assembly, is defined by an opened forward end, a closed rearward end, and a hollow interior. In turn, the hollow interior is defined by a lower surface, a rearward portion, a forward portion and an intermediate extent therebetween. A first aperture 22 is formed within the lower surface of the minor housing 20 assembly at the rearward portion. A second aperture 24 is formed within the lower surface of the minor housing 20 assembly at the forward portion. Additionally, a third aperture 26 is formed within the closed rearward end. The function of these apertures will be described in greater detail hereinafter.

The flash assembly of the present invention includes an apertured reflector 28 positioned within the opened forward end of the minor housing 20. This reflector 28 functions to direct and focus light forward of the minor housing 20. The flash lamp 32 employed in conjunction with the present invention is a high intensity lamp. The lamp is positioned within the aperture of the reflector 28. The power supply 34 for the lamp is positioned within the rearward portion of the minor housing 20. An electrical contact 36 is positioned within the first aperture 22 of the minor housing 20, and electrical wiring serves to interconnect the electrical contact 36, the power supply 34 and the flash lamp 32. The electrical contact 36 is adapted to be interconnected with a standard electrical connector positioned upon the upper portion of a photographic camera. Through this connector a camera can control the flash lamp 32 in conjunction with the camera shutter. Additional interconnection between the camera and flash assembly can be employed to regulate other functions. Any wiring required for these connections can be routed through the third aperture 26 within the minor housing 20.

An adjustment assembly is incorporated within the assembly of the present invention for the purpose of enabling user adjustment of the flash assembly relative to the photographic camera housing. This adjustment assembly is positioned within the second aperture 24 of the minor housing 20. The adjustment assembly includes a threaded bolt 38 which is threadably secured within the second aperture 24, and an angle adjusting nut 42 which is threadably positioned upon the threaded bolt 38. In use the lower end of the threaded bolt 38 is adapted to be connected to the upper surface of the camera lens. Thus, the bolt acts, in part, as a support in between the flash assembly and the photographic camera. With the bolt thus positioned the nut 42 can be rotated to alter the angular relationship between the lens assembly and the camera.

Figure 6:
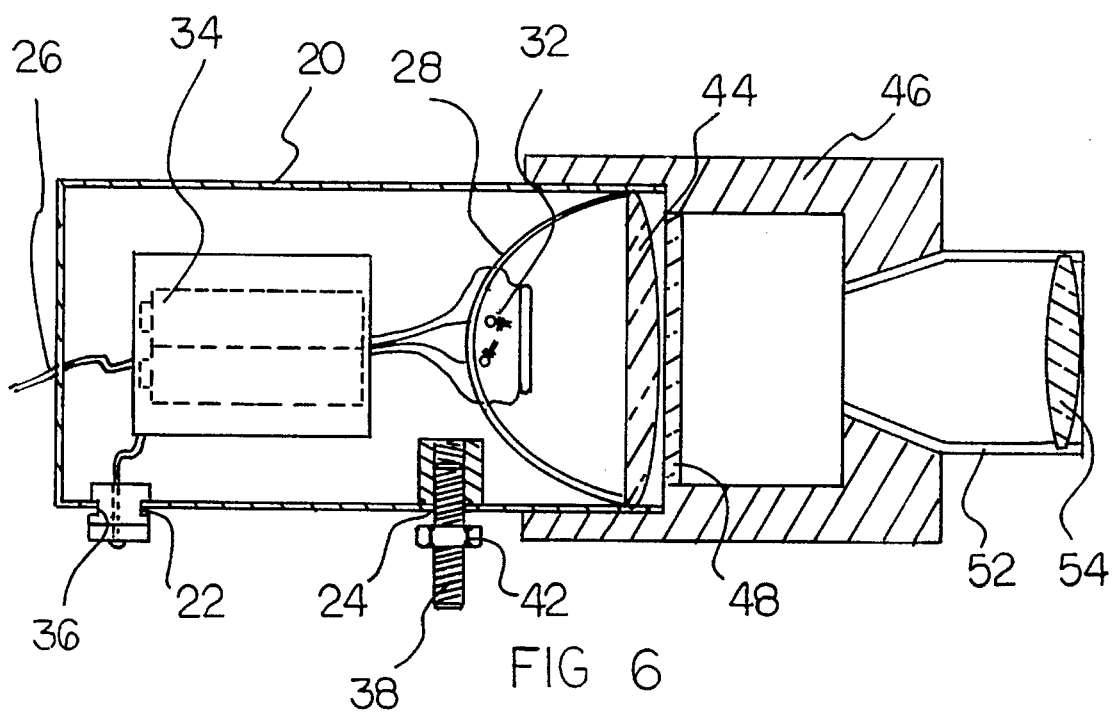
FIG. 6 is a sectional view taken along line 6—6 of FIG. 5.

A condensing lens 44 is positioned within the opened forward end of the minor housing 20. The condensing lens 44 is best illustrated in reference to FIG. 6. This condensing lens 44 functions to condense light emitted by the flash lamp 32 and directed by the reflector 28.

The second housing, or major housing 46 assembly, is defined by an apertured forward portion and an opened rearward portion. The opened rearward portion of the major housing 46 is adapted to be secured over the forward end of the minor housing 20. This securement can take be achieved in any number of manners, eg threaded connection, or friction fit. A diffusion lens 48 is positioned within the major housing 46 intermediate its forward and rearward portions. The diffusion lens 48 is adapted to scatter light which is emitted by the flash lamp 32, directed by the reflector 28 and concentrated by the condensing lens 44. This combination of a condensing lens 44 and diffusing lens creates a higher intensity light which can be projected over greater distances.

The third housing, or focusing lens housing 52 is defined by an opened forward portion and an opened rearward portion and a hollow intermediate extent. The rearward portion of the lens housing 52 is adapted to be inserted within the aperture of the forward portion of the major housing 46. A focusing lens 54 is positioned within the opened forward portion of the lens housing 52. This lens 54 is employed in directing the light emitted by the major housing 46 toward the desired target.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A camera flash magnification assembly comprising in combination:
    a cylindrical minor housing assembly having a opened forward end, a closed rearward end, and a hollow interior, the hollow interior having a lower surface, a rearward portion, a forward portion and an intermediate extent therebetween, an first aperture formed within the lower surface of the minor housing assembly at the rearward portion, a second aperture formed within the lower surface of the minor housing assembly at the forward portion, a third aperture formed within the closed rearward end;
    a flash assembly including an apertured reflector positioned within the opened forward end of the minor housing, a flash lamp positioned within the aperture of the reflector, a power supply & electronics positioned within the rearward portion of the minor housing, an electrical contact positioned within the first aperture of the minor housing, electrical wiring interconnecting the electrical contact, the power supply and the flash lamp;
    an adjustment assembly positioned within the second aperture of the minor housing, the adjustment assembly including a threaded bolt threadably secured within the second aperture, an angle adjusting nut threadably positioned upon the threaded bolt;
    a condensing lens positioned within the opened forward end of the minor housing, the condensing lens function to condense light emitted by the flash lamp and directed by the reflector;
    a major housing assembly having a apertured forward portion and an opened rearward portion, the opened rearward portion of the major housing adapted to be secured over the forward end of the minor housing, a diffusion lens positioned within the major housing intermediate the forward and rearward portions, the diffusion lens adapted to scatter light emitted by the flash lamp, directed by the reflector and concentrated by the condensing lens;
    a focusing lens housing having a opened forward portion and an opened rearward portion, the rearward portion of the lens housing adapted to be inserted within the aperture of the forward portion of the major housing, a focusing lens positioned within the opened forward portion of the lens housing.

2. A camera flash magnification assembly comprising in combination:
    a minor housing assembly having a opened forward end, a closed rearward end, and a hollow interior, the hollow interior having a lower surface, a rearward portion, a forward portion and an intermediate extent therebetween, an first aperture formed within the lower surface of the minor housing assembly at the rearward portion;
    a flash assembly including an apertured reflector positioned within the opened forward end of the minor housing, a flash lamp positioned within the aperture of the reflector, a power supply & electronics positioned within the rearward portion of the minor housing, an electrical contact positioned within the first aperture of the minor housing, electrical wiring interconnecting the electrical contact, the power supply and the flash lamp;
    a lens positioned within the opened forward end of the minor housing;
    a major housing assembly having a apertured forward portion and an opened rearward portion, the opened rearward portion of the major housing adapted to be secured over the forward end of the minor housing, a lens positioned within the major housing intermediate the forward and rearward portions;
    a focusing lens housing having a opened forward portion and an opened rearward portion, the rearward portion of the lens housing adapted to be inserted within the aperture of the forward portion of the major housing, a focusing lens positioned within the opened forward portion of the lens housing.

3. The assembly as described in claim 2 further comprising:
    a second aperture is formed within the lower surface of the minor housing at the forward portion; and
    an adjustment assembly positioned within the second aperture of the minor housing, the adjustment assembly including a threaded bolt threadably secured within the second aperture, an angle adjusting nut threadably positioned upon the threaded bolt.

4. The assembly as described in claim 2 wherein:
    the lens positioned within the minor housing is a condensing lens; and
    the lens positioned within the major housing is a diffusing lens.

* * * * *